US008675998B2

(12) United States Patent
Okuda et al.

(10) Patent No.: US 8,675,998 B2
(45) Date of Patent: Mar. 18, 2014

(54) METHOD AND APPARATUS FOR HIGH FREQUENCY COMPONENT SMOOTHING, AND IMAGE DISPLAY APPARATUS

(75) Inventors: Noritaka Okuda, Tokyo (JP); Shotaro Moriya, Tokyo (JP); Toshiaki Kubo, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1008 days.

(21) Appl. No.: 12/328,565

(22) Filed: Dec. 4, 2008

(65) Prior Publication Data
US 2009/0147022 A1 Jun. 11, 2009

(30) Foreign Application Priority Data

Dec. 6, 2007 (JP) ................................. 2007-315816
Oct. 17, 2008 (JP) ................................. 2008-268479

(51) Int. Cl.
*G06K 9/32* (2006.01)
(52) U.S. Cl.
USPC ............................ 382/298; 382/260; 382/275
(58) Field of Classification Search
USPC ..................... 345/204; 358/1.9; 382/168, 279
See application file for complete search history.

(56) References Cited

U.S. PATENT DOCUMENTS

| 5,016,118 | A | | 5/1991 | Nannichi |
| 5,418,899 | A | | 5/1995 | Aoki et al. |
| 5,771,107 | A | * | 6/1998 | Fujimoto et al. ............. 358/464 |
| 5,920,649 | A | * | 7/1999 | Yasuda et al. ................ 382/206 |
| 7,092,045 | B2 | * | 8/2006 | Haruna et al. ................ 348/745 |
| 8,014,601 | B2 | * | 9/2011 | Takahashi ..................... 382/168 |
| 8,331,731 | B2 | * | 12/2012 | Kashibuchi ................... 382/299 |
| 2008/0278738 | A1 | * | 11/2008 | Miyake .......................... 358/1.9 |
| 2009/0085896 | A1 | * | 4/2009 | Nagase et al. ................ 345/204 |
| 2009/0175558 | A1 | * | 7/2009 | Moriya et al. ................ 382/279 |
| 2009/0268964 | A1 | * | 10/2009 | Takahashi ..................... 382/170 |

FOREIGN PATENT DOCUMENTS

| JP | 2-86369 | A | 3/1990 |
| JP | 3-80771 | A | 4/1991 |
| JP | 5-328106 | A | 12/1993 |

(Continued)

OTHER PUBLICATIONS

Sekine H., et al., "Method and device for converting picture density," machine-translated Japanese application JP07-050752, published Feb. 1995.*

*Primary Examiner* — Vikkram Bali
*Assistant Examiner* — Xuemei Chen
(74) *Attorney, Agent, or Firm* — Birch, Stewart, Kolasch & Birch, LLP

(57) ABSTRACT

A method and apparatus for processing images, and an image display apparatus are provided that can produce favorable images even when digitized image are partially magnified (enlarged) or reduced (shrunk). The apparatus for expanding or reducing input image data supplied thereto, for each area of the image data, comprises a high frequency (HF) component smoothing processor that generates smoothed-HF-component image data by smoothing HF components of the input image data; a partial magnification/reduction controller that generates partial magnification/reduction control information that designates positions of pixels in image data obtained after expanding or reducing the input image data for each image area; and a pixel data generator that generates pixel data of pixel positions designated by the partial magnification/reduction control information in the smoothed-HF-component image data, by using pixel data in a neighborhood of the designated pixel positions.

11 Claims, 14 Drawing Sheets

(56) References Cited

FOREIGN PATENT DOCUMENTS

| | | | |
|---|---|---|---|
| JP | 7-50752 A | 2/1995 |
| JP | 8-102900 A | 4/1996 |
| JP | 2002-369071 A | 12/2002 |
| JP | 2003-179737 A | 6/2003 |
| JP | 2005-332154 A | 12/2005 |

* cited by examiner

| x | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| FIG.4A Da | 80 | 60 | 60 | 60 | 100 | 200 | 200 | 120 | 80 | 60 | 60 | 60 | 60 | 40 | 40 |
| FIG.4B Dd | | | | 80 | 150 | 200 | 160 | 100 | 70 | 60 | 60 | | | | |
| FIG.4C Dd | | | | 105 | 140 | 155 | 150 | 115 | 80 | 65 | 60 | | | | |
| FIG.4D Dd | | | | 110 | 110 | 110 | 110 | 110 | 105 | 85 | 65 | | | | |

= pixel of interest

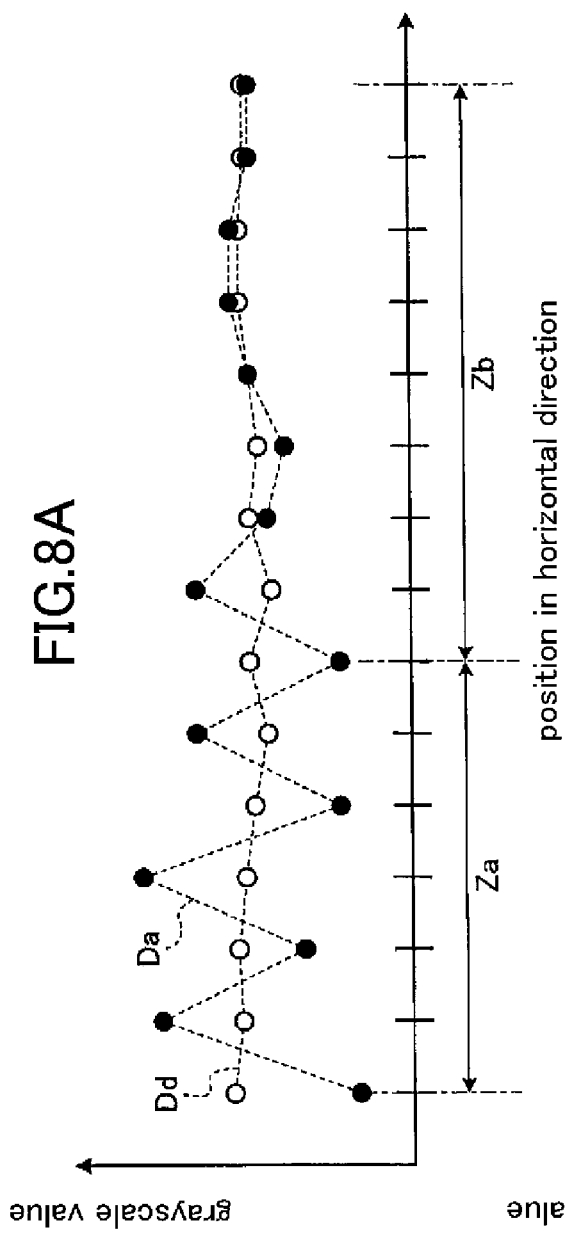
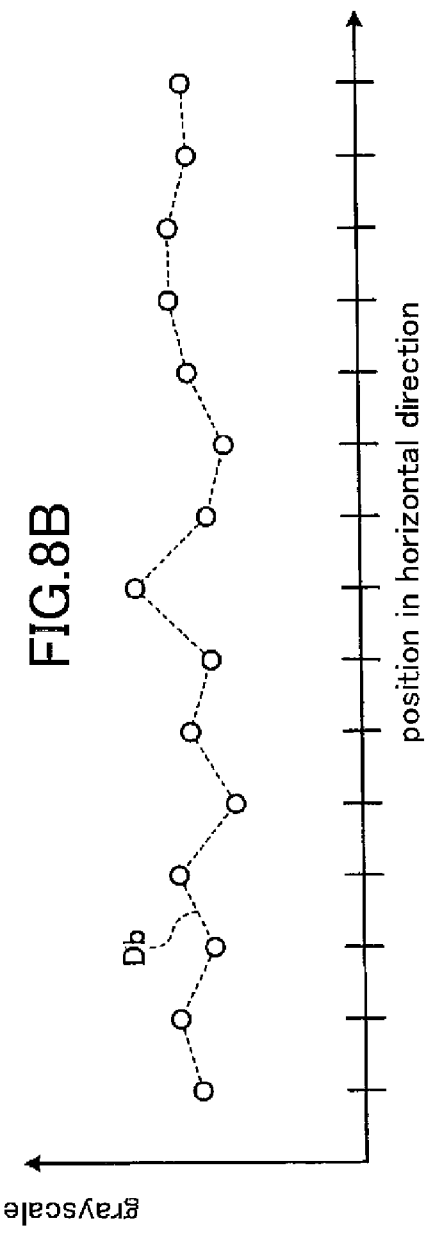

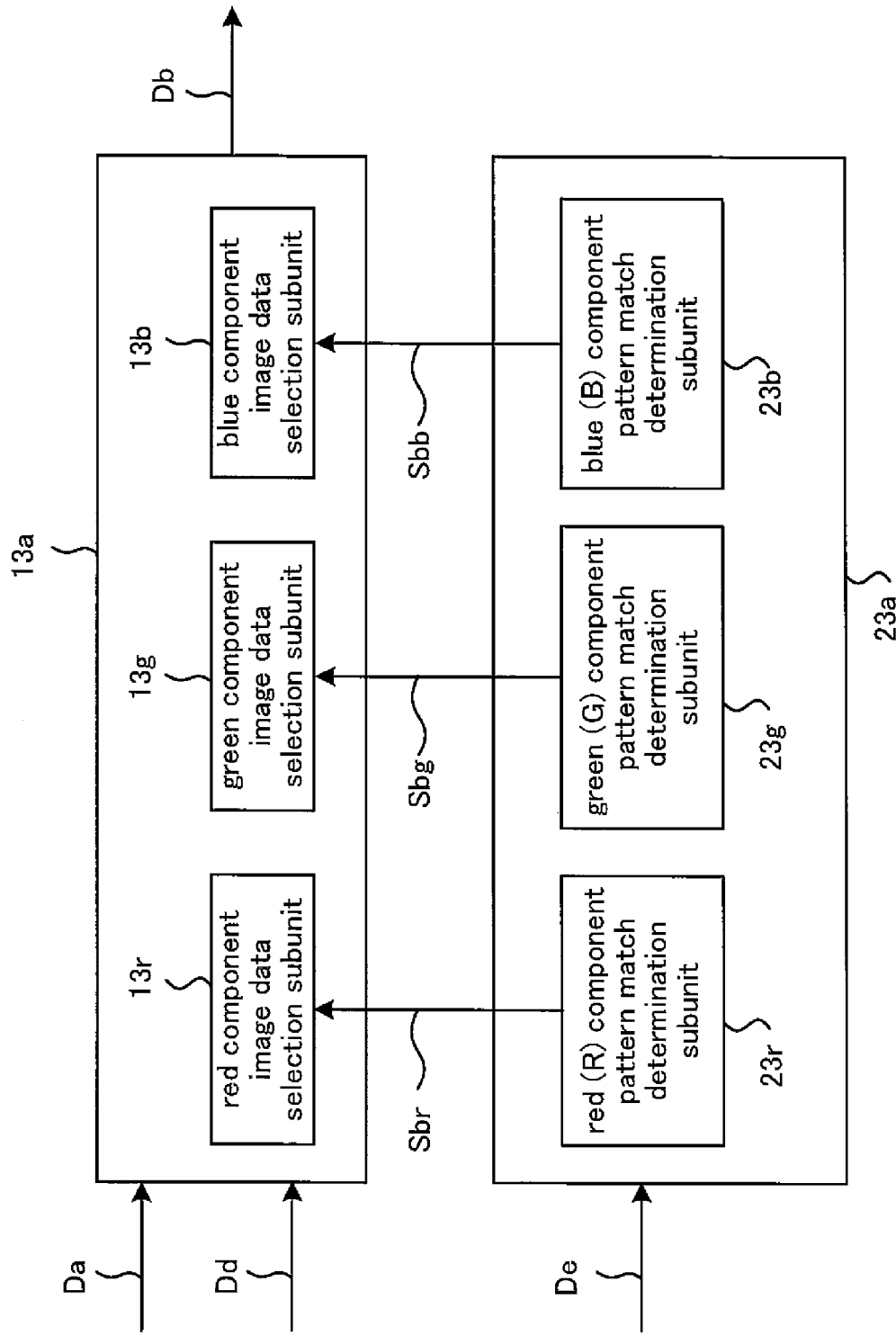

METHOD AND APPARATUS FOR HIGH FREQUENCY COMPONENT SMOOTHING, AND IMAGE DISPLAY APPARATUS

FIELD OF THE INVENTION

The present invention relates to methods and apparatuses for processing images, and image display apparatuses, whereby digitized images are partially magnified (enlarged) or reduced (shrunk), to display the images. More particularly, the invention relates to such apparatuses and methods that avoid moiré in an output image occurring when an image having relatively high spatial frequencies is supplied.

BACKGROUND OF THE INVENTION

A projection display apparatus such as a rear projection TV causes an image distortion resulting from a positional relationship between a screen and a projection light source, or aberration or the like that is generally inherent in any optical system. To correct the distortion, techniques to project light of an image created by applying an inverse distortion characteristic to the distortion are conventionally known.

As one of the techniques, there is a technique for correcting image data by electrical signal processing; for instance, proposed is a liquid crystal projector that corrects image distortion by changing, on a predetermined scan line number basis, the number of pixels in scan lines of input images in order to correct keystone distortion.

A method of varying the number of pixels includes one in which the pixel number is varied by interpolating pixel data between each pair of sample pixel data adjacent to each other in a scan line of the input image (refer to, for instance, Japanese Unexamined Patent publication No. H08-102900 (paragraphs 0012, 0014, 0027 and 0040; FIGS. 3, 4, 12 and 13).

A problem with the conventional technique in the foregoing description, however, is that when image data containing a high frequency (HF) component such as a checkered pattern is supplied, moiré occurs in an output image, owing to aliasing resulting from re-sampling at a pixel position after conversion of an original image, thus leading to very bad-looking images.

In light of the foregoing description, the present invention provides an image processing apparatus, an image processing method and an image display apparatus, whereby image signals can be generated such that favorable display images are achieved even when digitized images are partially magnified or reduced as in keystone distortion correction.

SUMMARY OF THE INVENTION

In order to overcome the forging problem to achieve an object, the image processing apparatus according to the present invention for expanding or reducing input image data supplied thereto, for each area of the image data, comprises a high frequency (HF) component smoothing processor that generates smoothed-HF-component image data by smoothing HF components of the input image data; a partial magnification/reduction controller that creates partial magnification/reduction control information that designates positions of pixels in image data obtained after expanding or reducing the input image data for each area of the image data; and a pixel data generator that generates pixel data for pixel positions designated based on the partial magnification/reduction control information in the smoothed-HF-component image data, by using pixel data in a neighborhood of the designated pixel positions.

According to the present invention, an advantageous effect is that even when a geometrical image distortion due to a projection optical system is corrected through signal processing, favorable images with reduced moiré can be generated by smoothing HF components of input image data and thereby magnifying or reducing the smoothed images for each area of the image data. These and other features, advantages and objects of the present invention will be further understood and appreciated by those skilled in the art by reference to the following drawings.

BRIEF DESCRIPTION OF THE DRAWINGS

FIG. 4 is a view showing a concrete example of the smoothing in the image display apparatus according to Embodiment 1 of the present invention;

FIGS. 8A and 8B are graphs for illustrating processing by an image data select unit in the image display apparatus according to Embodiment 1 of the present invention;

FIG. 9 is a block diagram for illustrating processing of each color between the pattern match determination unit and the image data select unit in the image display apparatus according to Embodiment 1 of the present invention;

DESCRIPTION OF THE PREFERRED EMBODIMENTS

Preferred embodiments of a method and apparatus for processing images and an image display apparatus according to the present invention, will be described below in greater detail based on the figures. It will be understood by those skilled in the art that the present invention is not limited to the subsequent description, but various modifications may be made accordingly without departing the spirit and scope of the present invention.

Embodiment 1

Figure 1:
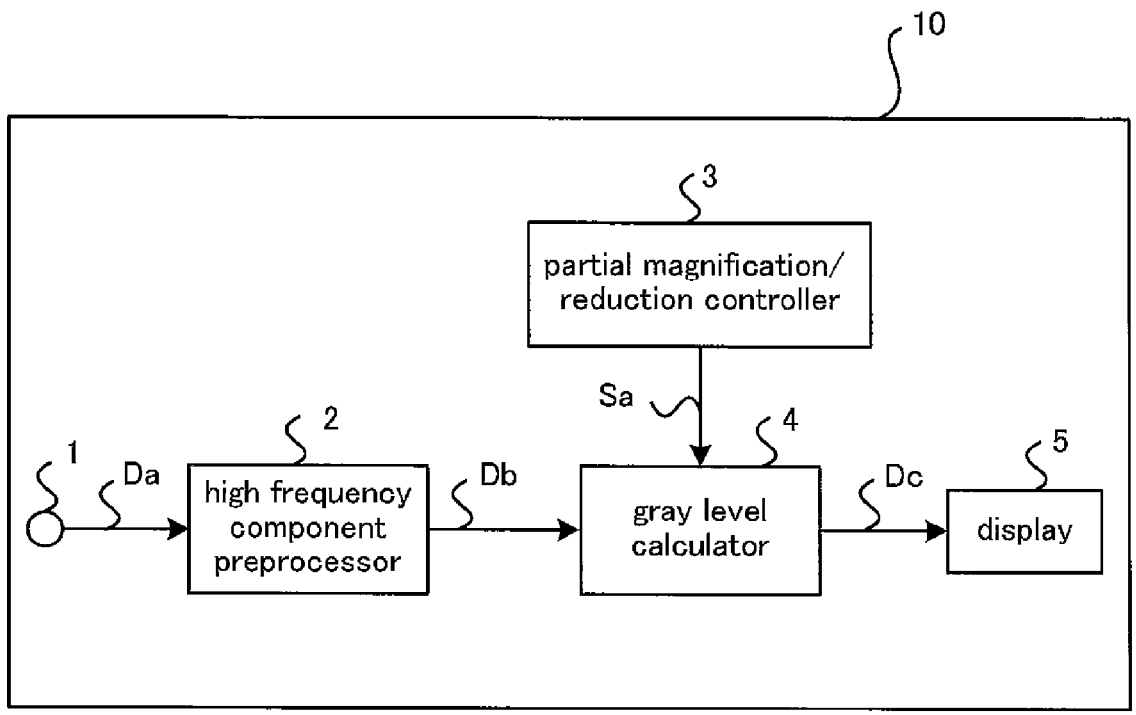
FIG. 1 is a block diagram illustrating a configuration of an image display apparatus according to Embodiment 1 of the present invention.

FIG. 1 is a block diagram showing a general configuration of an image display apparatus 10 according to Embodiment 1 of the present invention.

The image display apparatus 10 according to Embodiment 1 includes an input terminal 1, a high frequency (HF) component preprocessor 2, a partial magnification/reduction controller 3, a gray level calculator 4, and a display 5.

The input terminal 1 receives input image data Da that in turn is supplied to the HF component preprocessor 2. The preprocessor 2 is a HF-component smoothing processor that smoothes HF components of the input image data Da, to generate and deliver smoothed-HF-component image data Db. The partial magnification/reduction controller 3 delivers to the gray level calculator 4 partial magnification/reduction control information Sa that defines a pixel position obtained after expanding/reducing image data for each area of the data, based on a command of an amount of correction from a controller (not shown). The gray level calculator 4 is a pixel data generator that generates, using pixels in a neighborhood of the position, pixel data at a position designated by the control information Sa in the smoothed-HF-component image data Db, to then produce as an output partially expanded/reduced image data Dc. The display 5 performs representation of the image data Dc with brightness corresponding to the image data Dc.

Figure 2:
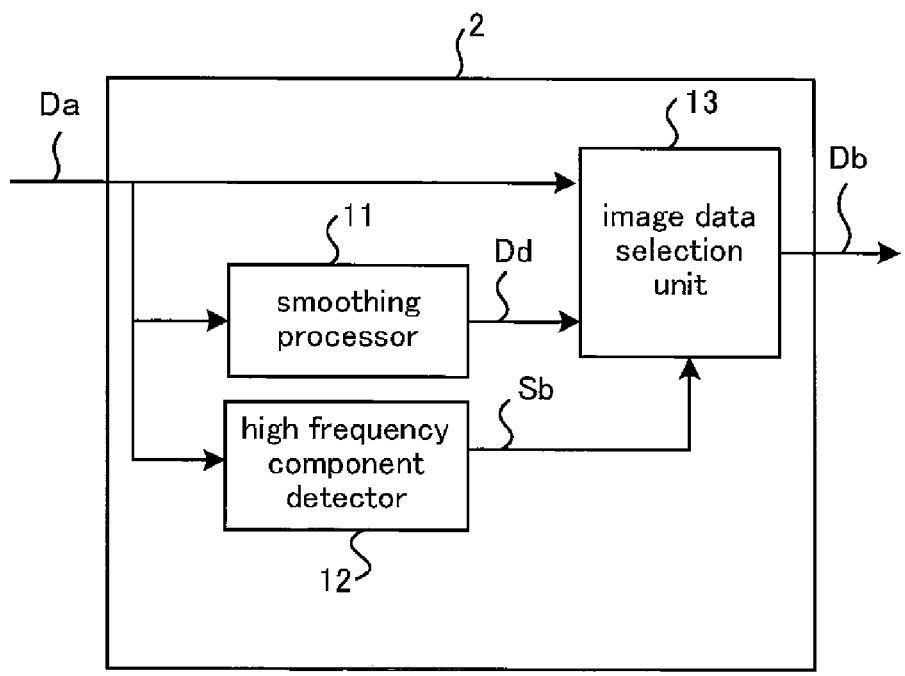
FIG. 2 is a block diagram illustrating a configuration of a high frequency (HF) component preprocessor of the image display apparatus according to Embodiment 1 of the present invention.

Here, an internal configuration of the HF-component-preprocessor 2 will be described in greater detail. FIG. 2 is a block diagram showing the internal configuration of the preprocessor 2. The preprocessor 2 includes a smoothing processor 11, an HF component detector 12, and an image data selection unit 13. In the preprocessor 2, the input image data Da is supplied to the smoothing processor 11, the HF component detector 12, and the image data selection unit 13. The smoothing processor 11 smoothes the input image data Da, to generate and deliver smoothed image data Dd.

The detector 12 detects HF components of the image data Da based on predetermined reference, to thereby generate and deliver HF-component detection information Sb indicating in which pixel in the data Da an HF component exists. The selection unit 13 selects, for each pixel, the input image data Da or the smoothed image data Dd based on the detection information Sb, to deliver the selected image data as the image data Db.

Figure 3A:
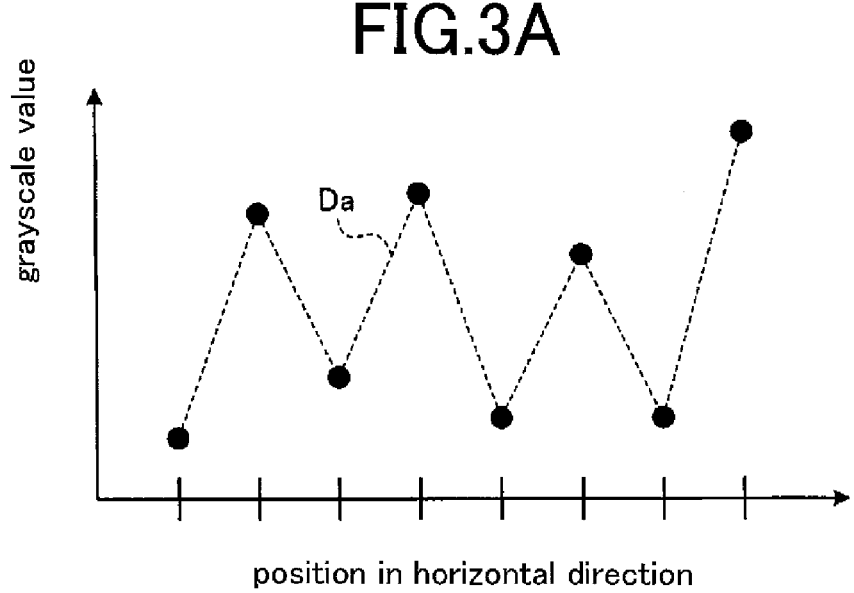
FIG. 3 is a graph for illustrating smoothing in the image display apparatus according to Embodiment 1 of the present invention.
Figure 3B:
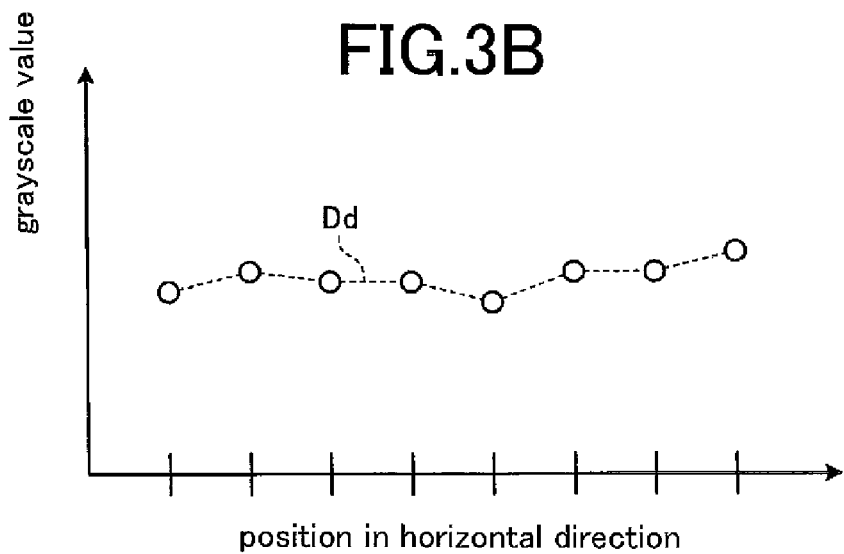

FIGS. 3A and 3B are views for illustrating processing of the smoothing processor 11; FIG. 3A shows an example of the input image data Da, while FIG. 3B shows an example of the smoothed image data Dd obtained after smoothing the input image data Da of FIG. 3A using the processor 11. In both figures, the horizontal axis denotes horizontal image positions and the vertical axis, grayscale values.

The smoothing processor 11 is configured with, for instance, a mean filter or the like that processes into output pixel data an average value of pixel data in a neighborhood of a pixel of interest (or a given pixel). FIGS. 4A through 4D show examples of grayscale values of each pixel in the input image data Da and the smoothed image data Dd in situations where the processor 11 is configured with a mean filter using horizontally adjacent pixels; a value filled in each square represents a grayscale value of each pixel, with x denoting a coordinate of each pixel in the horizontal direction.

FIG. 4A shows the input image data Da, and FIGS. 4B, 4C and 4D show smoothed image data Dd of using a mean filter for two reference pixel values, a mean filter for four reference pixel values, and a mean filter for eight reference pixel values, respectively. That is, the mean filter for two pixel values is one using two horizontally adjacent pixel values; the mean filter for four pixel values is one using four horizontally adjacent pixel values; and the mean filter for eight pixel values is one using eight horizontally adjacent pixel values.

For instance, a pixel of the coordinate 7 in FIG. 4B denotes an average value of the pixel of the coordinates 7 and 8 in FIG. 4A; a pixel of the coordinate 7 in FIG. 4C denotes an average value of the pixels of the coordinates 6, 7, 8 and 9 in FIG. 4A; and a pixel of the coordinate 6 in FIG. 4D denotes an average value of the pixels of the coordinates 4 through 11 in FIG. 4A. Note that although FIGS. 4A through 4D show examples of using the mean filter for two reference pixel values, the mean filter for four reference pixel values, and the mean filter for eight reference pixel values, the invention is not limited to this processing used for smoothing, but may use another smoothing such as of a Gaussian filter.

Figure 5:
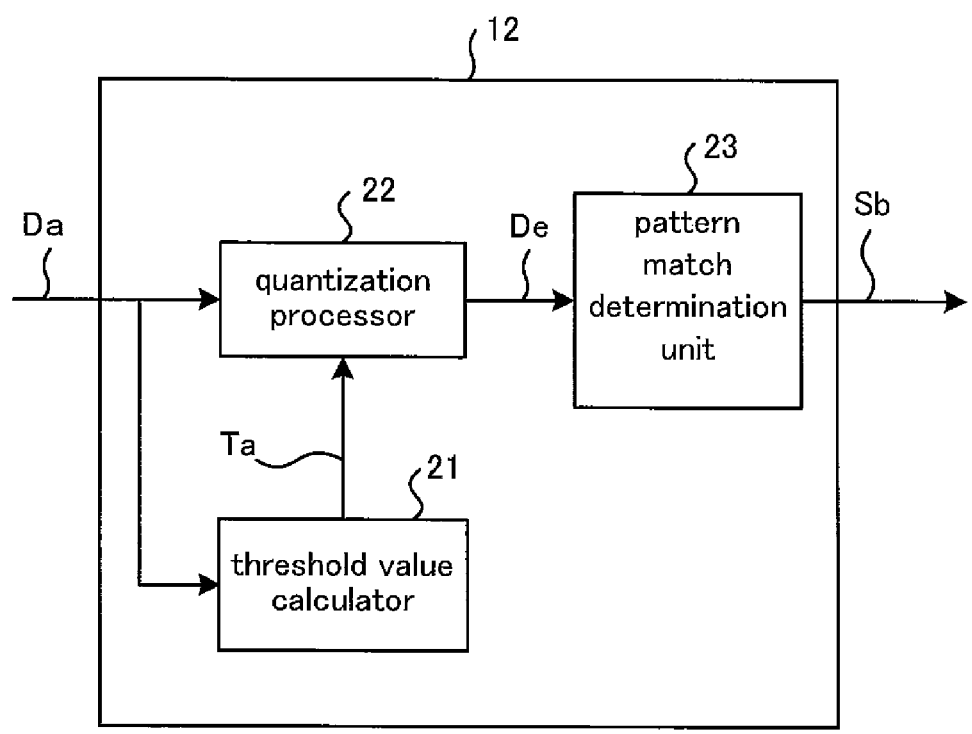
FIG. 5 is a block diagram showing a configuration of the HF component detector of the image display apparatus according to Embodiment 1 of the present invention.

Next, the HF component detector 12 will be described in greater detail. FIG. 5 is a view depicting an internal configuration of the detector 12. The detector 12 includes a threshold calculator 21, a quantization processor 22, and a pattern match determination unit 23. The threshold calculator 21 delivers threshold data Ta for quantizing the input image data Da based on a preset fixed value, or the input image data Da. The quantization processor 22 quantizes the image data Da based on the threshold data Ta to be supplied from the threshold calculator 21, to then produce output quantization image data De.

The pattern match determination unit 23 performs pattern match determination in order to find out in which pixel in the input image data the HF component exists, based on the quantization image data De and the pattern data (here, binary pattern data) of the plurality of preset values, to then produce, as output, pattern match determination information (high frequency (HF) component detection information) Sb.

FIGS. 6A and 6B are views showing an example of processing in the threshold calculator 21 and the quantization processor 22. In the graph of FIG. 6A, the horizontal axis denotes positions in the horizontal direction (pixel position) and the vertical axis, grayscale values, which represents a relationship between the input image data Da and the threshold data Ta. FIG. 6B shows quantization image data De in situations where the input image data Da and threshold data Ta have a relationship as shown in FIG. 6A.

In the case of FIGS. 6A and 6B, the threshold calculator 21 delivers to the quantization processor 22 the threshold data Ta including one preset fixed value (grayscale value). The processor 22 quantizes input image data Da into binary data so that the value of a pixel is made zero in which a grayscale value of the input image data Da is smaller than the threshold data Ta, and the value of a pixel is made one in which the grayscale value of the input image data Da is greater than the data Ta. Although FIGS. 6A and 6B show the example in which the threshold calculator 21 produces the threshold data Ta including one preset fixed value (grayscale value) and the quantization processor 22 performs binary quantization based on the threshold data Ta, the invention is not limited to such operations of the processor 22 and calculator 21, but another example thereof will be described later.

Figure 7:
FIG. 7 is a view showing an example of digitization pattern used for pattern match determination in the image display apparatus according to Embodiment 1 of the present invention.

The determination unit 23 performs pattern matching based on the image data De and the preset binary pattern data. FIG. 7 shows an example of binary pattern data used for pattern matching. In the case of FIG. 7, binary pattern data having values of one and zero alternately lined up for each pixel is used in order to detect the HF component. FIGS. 7(a) and 7(a)' show the binary pattern data employed to perform pattern matching by using two reference pixels; FIGS. 7(b) and 7(b)', by four reference pixels; and FIGS. 7(c) and 7(c)', by eight reference pixels.

For instance, when the pattern matching by using two reference pixels is performed, determination is made whether either one of FIG. 7(a) or FIG. 7(b) coincides with quantization image data De.

The pattern matching by using four or eight reference pixels is also determined in a similar way, and determination result is output as the pattern match determination information (HF-component detection information) Sb. In this way, the comparison of the binary-encoded image data with the binary pattern data allows for detection of an HF component contained in an input image.

Here, binary pattern data used for the pattern matching shown in FIG. 7 is a mere example, and any type of binary pattern data, if applied for detection of an HF component, may be used. For instance, when a component of an image area having a frequency lower than the example of FIG. 7 is detected, binary pattern data in which values of zero and one are lined up alternately for each two pixels may be used or applied. Further, a plurality of different patterns may be used to determine whether the quantization image data coincides with either of two pattern data: one data in which values of zero and one are lined up alternately for each pixel, or the other data in which the values are lined up alternately for each two pixels. Further, the reference pixel number may be the same as, or different from that used for smoothing at the smoothing processor 11. Moreover, the pattern match determination information (HF-component detection information) Sb may contain binary data, or multiple value data.

The image data selection unit 13 selectively outputs for each pixel the input image data Da or the smoothed image data Dd according to the determination information (HF-component detection information) Sb. If it is indicated that the determination information (HF-component detection information) Sb contains HF components in a neighborhood of a pixel of interest in the input image data Da, then the selection unit 13 selectively outputs the smoothed image data Dd. In contrast, if it is indicated that the information (HF-component detection information) Sb does not contain HF components in the neighborhood of the pixel of interest in the data Da, then the unit 13 selectively outputs the data Da.

As discussed above, by outputting the smoothed image data Dd in pixels containing HF components, smoothed-HF-component image data Db can be gained in which HF components contained in the input image data Da have been eliminated.

The selection unit 13 may not only selectively output, according to the pattern match determination information (HF-component detection information) Sb, either one of the input image data Da and the smoothed image data Dd, but also calculate a weighted average of the input image data Da and the image data Dd. In this case, the weights of the weighted average are controlled to calculate the smoothed-HF-component image data Db according to the information (HF-component detection information) Sb.

If it is indicated that the information (HF-component detection information) Sb includes HF components in the neighborhood of a pixel of interest of the input image data Da, then the selection unit 13 makes greater a weighting factor to be applied to the smoothed image data Dd, and smaller a weighting factor to the input image data Da. In contrast, if it is indicated that no HF components are included in the neighborhood of the pixel of interest of the data Da, then a weighting factor to be applied to the data Da is controlled to be greater, while a weighting factor to the data Dd is controlled to be smaller.

FIGS. 8A and 8B are graphs showing relationships among the input image data Da, the smoothed image data Dd and the smoothed-HF-component image data Db, in situations where weighted average is used in calculating the smoothed image data Db. FIG. 8A shows the input image data Da and smoothed image data Dd, while FIG. 8B shows the smoothed image data Db. Note that in both graphs, the horizontal axis denotes the image positions in the horizontal direction and the vertical axis, grayscale values.

When the pattern match determination unit 23 determines that the interval Za contains HF components, while the interval Zb does not, in terms of, e.g., the input image data Da shown in FIG. 8A, the image data selection unit 13 calculates a weighted average so that a weighting factor to be applied to the smoothed image data Dd is controlled to be greater in the interval Za, while the factor to the input image data Da is controlled to be greater in the interval Zb. FIG. 8B shows the smoothed-HF-component image data Db in assigning in the interval Za the weighting factors of the data Da and the data Dd as Da=0.25 and Dd=0.75, respectively, and in the interval Zb the weighting factors thereof as Da=1.0 and Dd=0. By producing the weighting average in this way, image bias due to smoothing of HF components can be suppressed.

Note that in an example shown in FIG. 8, the image data selection unit 13 selects, based on the pattern match determination information (HF-component detection information) Sb, the weighting factor from two combinations, to then calculate the weighted average, but the invention is not limited to this method of calculating the weighted average.

Next, processing of each color in the pattern match determination unit 23 and the image data selection unit 13, will be described. FIG. 9 is a view illustrating processing of each color in a pattern match determination unit 23a and an image data selection unit 13a. The pattern match determination unit 23a includes a red (R) component pattern match determination subunit 23r, a green (G) component pattern match determination subunit 23g, and a blue (B) component pattern match determination subunit 23b. And the image data selection unit 13a includes a red (R) component image data selection subunit 13r, a green (G) component image data selection subunit 13g, and a blue (B) component image data selection subunit 13b.

Each of the red color pattern match determination subunit 23r, the green color pattern match determination subunit 23g, and the blue color pattern match determination subunit 23b, of the pattern match determination unit 23a performs pattern match determination for each color element of red, green, and blue.

And each of the red determination subunit 23r, the green determination subunit 23g, and the blue determination subunit 23b generates each determination result of respective color elements, as red color pattern match determination information (HF-component detection information) Sbr, green color pattern match determination information (HF-component detection information) Sbg, and blue color pattern match determination information (HF-component detection information) Sbb, to then deliver such information to a selection subunit corresponding to a particular color in the image data selection unit 13a.

The red color image data selection subunit 13r, the green color image data selection subunit 13g, and the blue color image data selection subunit 13b, of the image data selection unit 13a, each select image data in terms of respective color elements based on pattern match determination information corresponding to a color element. This allows the smoothed-HF-component image data Db to be gained by removing, for each color, HF components contained in the input image data Da, and also a color bias in smoothed-HF-component image data to be reduced.

Figure 10:
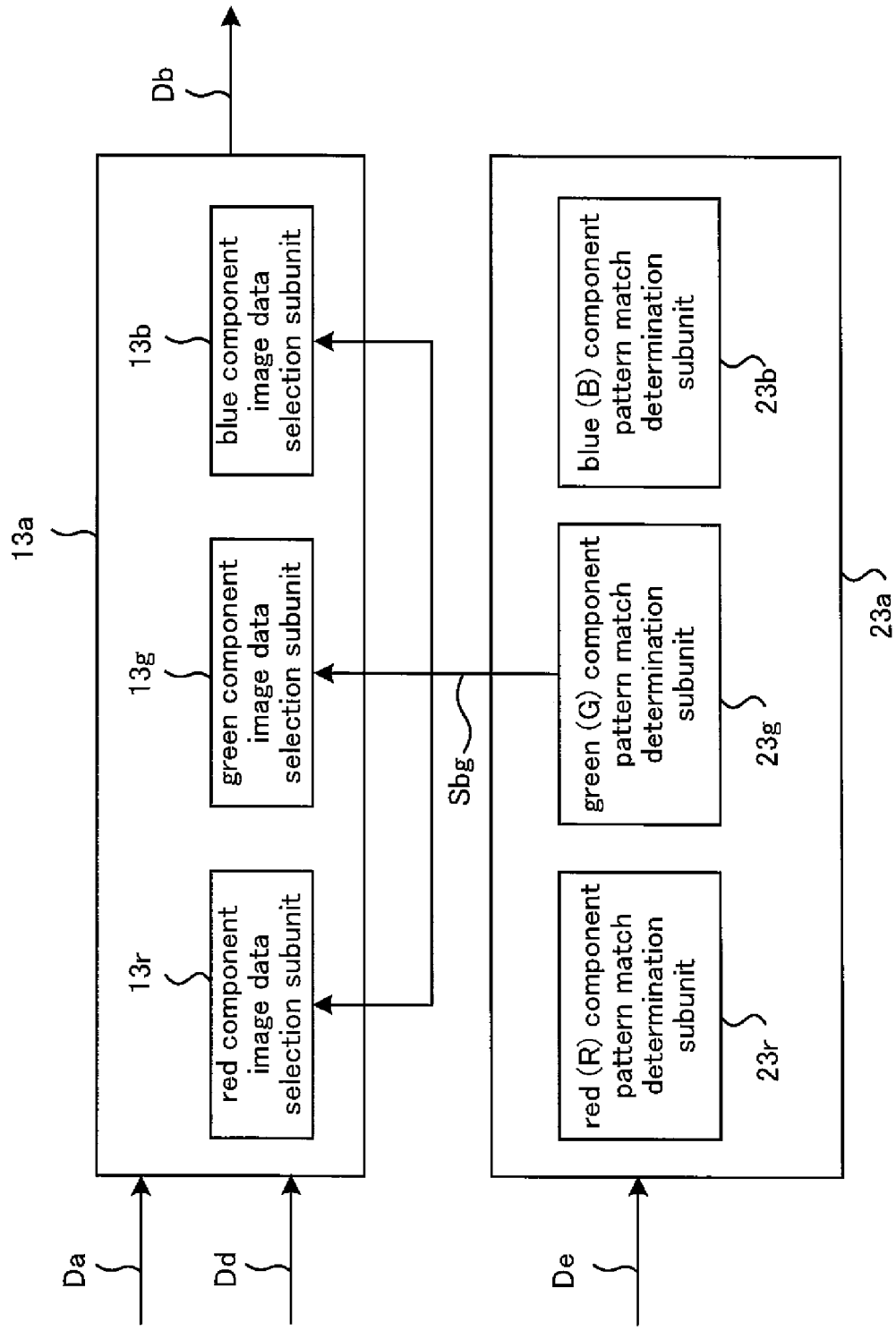
FIG. 10 is a block diagram for illustrating another processing of each color between the pattern match determination unit and the image data select unit in the image display apparatus according to Embodiment 1 of the present invention.

FIG. 10 is a view showing an example of another processing of each color in the pattern match determination unit 23a and the image data selection unit 13a. In the example of FIG. 10, all of the red color image data selection unit 13r, the green color image data selection unit 13g, and the blue color image data selection unit 13b select image data based on the green determination information (HF-component detection information) Sbg alone. While in the case of FIG. 10, all of the color element image data are selected based on the green color pattern match determination information, the invention is not limited to this, and the image data selection unit 13a may select image data of all the color elements, based on red determination information (HF-component detection information) Sbr or blue determination information (HF-component detection information) Sbb.

In this way, image data of all the color elements are selected based on pattern match determination information for a particular color element, whereby coloration due to images for a particular color element alone being smoothed can be suppressed in situations where the input image contains an HF component of the particular color element.

The controller 3 generates the partial magnification/reduction control information Sa for expanding/reducing image data for each area of the data, to output it, in order to correct the image data to an arbitrary shape. The control information Sa contains data designating pixel positions after expanding/reducing image data for each area of the data.

The gray level calculator 4 computes a grayscale value at a pixel position indicated by partial magnification/reduction control information Sa. When a pixel position indicated by the control information Sa is located where pixels of the image data Db do not exist, the gray level calculator 4 computes a grayscale value in the pixel position using pixels in a neighborhood of the pixel position of the image data Db As in the foregoing description, the partial magnification/reduction controller 3 produces data for designating a pixel position obtained after expanding or reducing image data for each area of the data, and the gray level calculator 4 newly computes a grayscale value in the pixel position, whereby an input image is partially magnified or reduced to correct the input image to an arbitrary shape. Here, the smoothed-HF-component image data Db supplied to the gray level calculator 4 is image data in which an HF component contained in the input image data Da has been removed in the HF component preprocessor 2. For this reason, occurrence of moiré resulting from aliasing due to resampling of input images containing HF components, at pixel positions after conversion can be suppressed in the gray level calculator 4.

Figure 6:
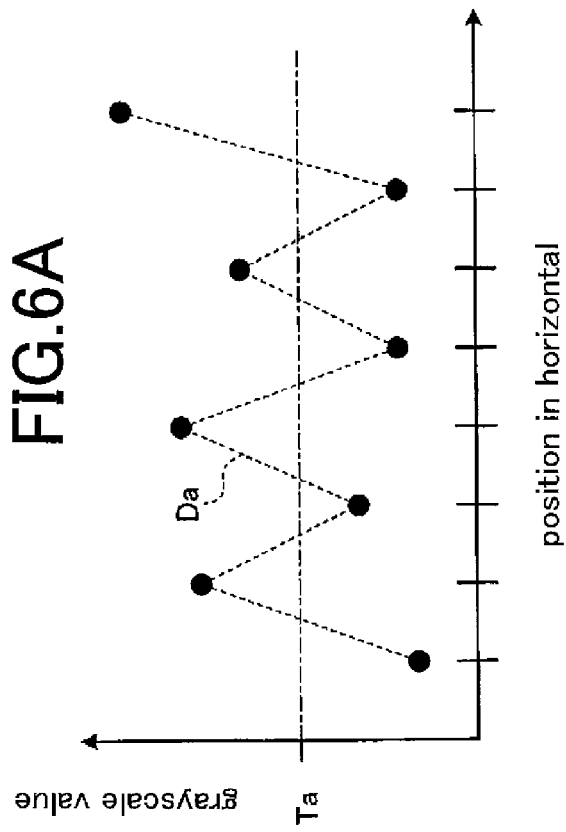
FIGS. 6A and 6B are views for illustrating quantization processing in the image display apparatus according to Embodiment 1 of the present invention.

Next, another processing example of the quantization processor 22 and the threshold calculator 21 will be described. In FIG. 6, although a situation is shown where the threshold calculator 21 produces the threshold data Ta including one preset fixed value, and the quantization processor 22 quantizes the input image data Da into binary values based on the threshold data Ta, the threshold calculator 21 may produce as the threshold data Tb the average grayscale value of pixels in a neighborhood of a pixel of interest in the data Da.

Figure 11:
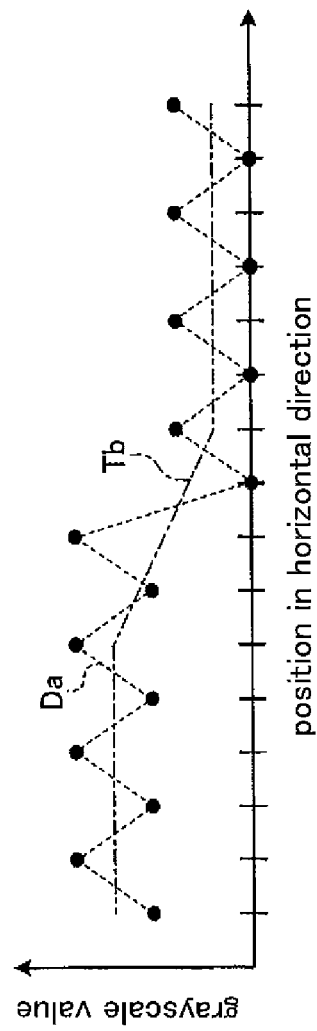
FIGS. 11A and 11B are views for illustrating quantization processing in the image display apparatus according to Embodiment 1 of the present invention.

FIGS. 11A and 11B are views showing an example of this case. The horizontal axis in a graph of FIG. 11A represents image positions in the horizontal direction (pixel position) and the vertical axis therein, grayscale values, and the graph shows values of input image data Da and threshold data Ta. The threshold data Tb is the average grayscale value of four pixels in a neighborhood of a pixel of interest in the input image data Da, while FIG. 11B shows the quantization image data De in situations where the input image data Da and the threshold data Tb are shown in FIG. 11A. In the case of FIG. 11, the quantization processor 22 binary-encodes the data Da based on the data Tb, to produce the output data De.

In this way, the threshold calculator 21 produces, as the threshold data Tb, the average grayscale value of pixels in the neighborhood of the pixel of interest in the input image data Da, whereby HF components can correctly be detected even when there exist HF components differing in grayscale value.

Figure 12:
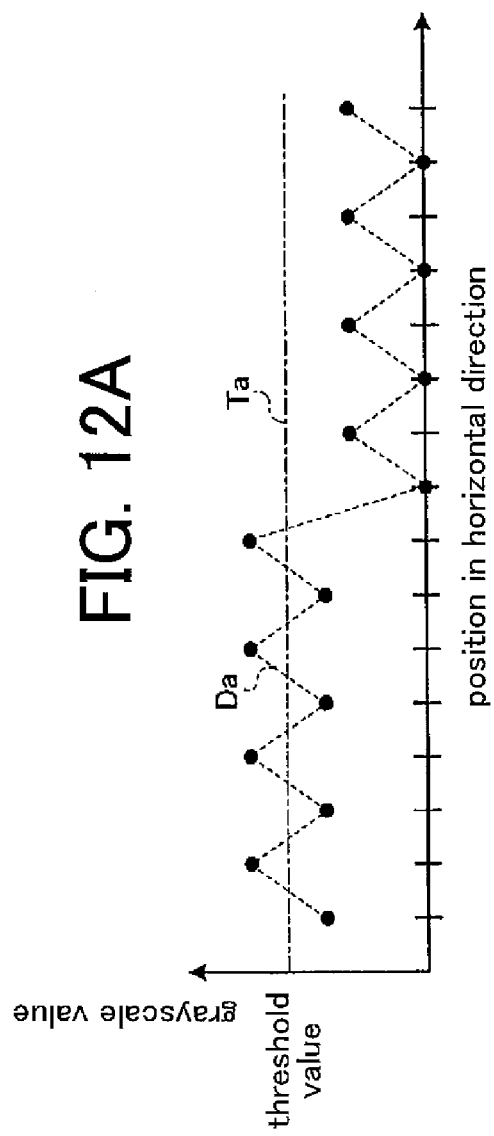
FIGS. 12A and 12B are views for illustrating conventional quantization processing.

For comparison, with respect to the input image data Da as shown in FIG. 11A, FIGS. 12A and 12B show that the threshold calculator 21 generates the threshold data Ta including one preset fixed value as illustrated in FIG. 6, and the quantization processor 22 quantizes the data Da into binary values based on the data Ta. The horizontal axis in a graph of FIG. 12A represents image positions in the horizontal direction (pixel positions) and the vertical axis therein, grayscale values; the graph thereof shows values of the input image data Da and the threshold data Ta, while FIG. 12B shows the quantization image data De in situations where the data Da and the data Ta are shown in FIG. 12 A.

In this situation, the quantization image data De supplied from the quantization processor 22 is one such as shown in FIG. 12 B. When there exist HF components differing in grayscale value, there exist some data whose HF component will not correctly be detected or properly processed accordingly.

Another different example of processing of the quantization processor 22 and the threshold calculator 21 will be described. While in the example of FIG. 11, an example is shown in which the threshold calculator 21 produces as the threshold data Tb the average value of grayscale ones of pixels in the neighborhood of the pixel of interest in the input image data Da, an example in which the threshold calculator 21 further produces another threshold data Tc, while the quantization processor 22 may quantize the input image data Da into a ternary data based on two threshold data Tb and Tc.

Figure 13:
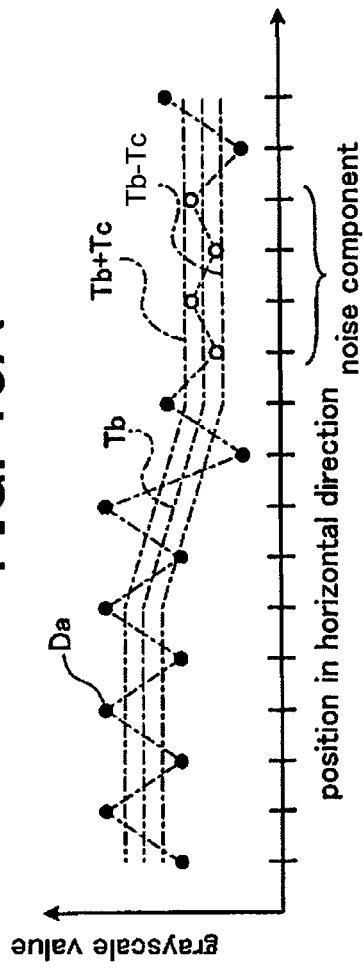
FIGS. 13A and 13B are views for illustrating ternary quantization in the image display apparatus according to Embodiment 1 of the present invention.

FIGS. 13A and 13B are views showing an example of the processing in this situation. A graph in FIG. 13A, whose horizontal axis represents image positions in the horizontal direction (the position of pixel) and whose vertical axis represents grayscale values, illustrates a relationship among the input image data Da and the threshold data Tb and Tc, while FIG. 13B indicates quantization image data De in situations where the input image data Da, and two threshold data Tb and Tc, are shown in FIG. 13A. In an example of FIG. 13, the quantization processor 22 ternary-quantizes, based on two threshold data Tb and Tc, the input image data Da as one when $Da > Tb+Tc$, as zero when $Da < Tb-Tc$, and as two when $Tb+Tc \geq Da \geq Tb-Tc$.

Since the pattern match determination unit 23 detects, as an HF component, a pattern such that the values of zero and one of the quantization image data De inverse for each pixel, image data quantized as two will not be detected as an HF component.

As in an input image data Da as shown in FIG. 13A, for instance, when the input image data Da contain minute HF components because of noise being added to originally gradually varying gray scale and if the data is quantized into two levels using threshold data Tb alone, then noise components are misidentified as original HF components of the images, which leads to unnecessary smoothing. On the other hand, as shown in FIG. 13A, the quantization processor 22 quantizes the data into a ternary value using two threshold data Tb and Tc, thereby avoiding unnecessary smoothing from being performed.

Embodiment 2

While in Embodiment 1 a situation where the HF component preprocessor 2 performs preprocessing using adjacent pixels in the horizontal direction of a pixel of interest has been described, HF component preprocessing may be performed, in addition to adjacent pixels in the horizontal direction, using those in the vertical direction, based on the smoothed-HF-component image data Db to be supplied from the image data selection unit 13. In this case, since the preprocessing using adjacent pixels in the vertical direction differs in terms of reference pixels alone and the rest of processing is similar to that of the selection unit 13 as discussed above, detail description thereof will be omitted. In this manner, after the preprocessing has been performed by using adjacent pixels in the horizontal direction, another preprocessing is done by using those in the vertical direction, whereby a pattern that cannot be detected by only preprocessing in the horizontal direction—for instance, a striped pattern in the horizontal direction, and the like—can be detected.

In Embodiment 2, an image data delay memory is provided that serves to perform such HF-component preprocessing, as will be described below. Not that since configurations other than that of the HF component preprocessor in the image display apparatus according to Embodiment 2 are substantially similar to those in Embodiment 1, the same reference numerals are applied to units in the configurations similar to Embodiment 1, and the embodiment will be described hereinafter with a particular emphasis on the HP component preprocessor.

Figure 14:
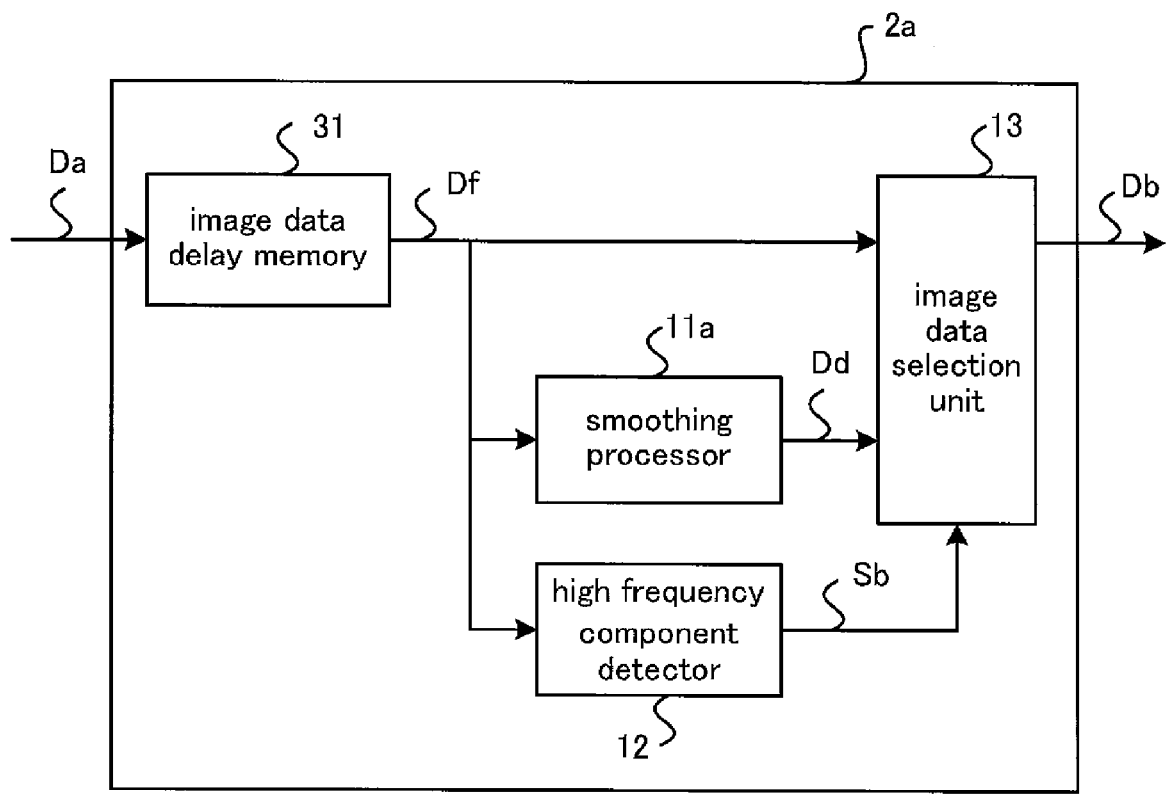
FIG. 14 is a block diagram showing a configuration of an HF component preprocessor of an image display apparatus according to Embodiment 2 of the present invention.

The image display apparatus according to Embodiment 2 includes an HF component preprocessor 2a in place of the HF component preprocessor 2 according to Embodiment 1. FIG. 14 is a block diagram showing an internal configuration of the HF component preprocessor 2a in the image display apparatus according to Embodiment 2. The preprocessor 2a includes an image data delay memory 31, a smoothing processor 11a, the HF component detector 12, and the image data selection unit 13, as shown in FIG. 14.

The image data delay memory 31, which is configured with a memory that retains image data for a single line of the input image data Da or image data for a plurality of lines for delay, delivers image data of a plurality of lines as a plural line image data Df.

The smoothing processor 11a performs smoothing by using adjacent pixels in the vertical and horizontal directions. Note that detailed description of the processor will be omitted because it is similar to that of Embodiment 1 except for cases where smoothing is performed by using not only the adjacent pixels in the horizontal direction, but also those in the vertical direction. Description of functionalities of the detector 12 and the selection unit 13 will also be omitted because of being similar to those of Embodiment 1.

Next, the detector 12 according to the present embodiment will be described. The internal configuration of the detector 12, as shown in a block diagram, is similar to that of Embodiment 1 as shown in FIG. 5. Description of the threshold calculator 21 will be omitted because of its operation being similar to that of Embodiment 1. The quantization processor 22 performs quantization processing by using adjacent pixels of a pixel of interest in the vertical and horizontal directions. The detail description will be omitted because it is similar to that of Embodiment 1 except for cases where smoothing is performed by using not only the adjacent pixels in the horizontal direction, but also adjacent pixels in the vertical direction.

Figure 15:
FIG. 15 is a view showing an example of digitization pattern used for pattern match determination in the image display apparatus according to Embodiment 2 of the present invention.

Further, in the present embodiment, the determination unit 23 in the detector 12 performs pattern match determination by using adjacent pixels of a pixel of interest in the vertical and horizontal directions. FIG. 15 shows an example of a binary pattern in situations where pattern match determination is performed by using a block of four-by-four pixels in the neighborhood of the pixel of interest. The example of FIG. 15 uses a binary pattern in which values of one and zero are lined up alternately for each pixel in the vertical and horizontal directions in order to detect a checkered pattern of the HF. The determination unit 23 determines whether either one of FIG. 15(a) or FIG. 15(a)' coincides with quantization image data De. Note that although FIG. 15 shows a binary pattern in situations where a block of four-by-four pixels in the neighborhood of the pixel of interest is used, the invention is not limited to this pixel number to be used.

Figure 16:
FIG. 16 is a view showing another example of digitization pattern used for pattern match determination in the image display apparatus according to Embodiment 2 of the present invention.
Figure 17:
FIG. 17 is a view showing another example of digitization pattern used for pattern match determination in the image display apparatus according to Embodiment 2 of the present invention.

FIG. 16 shows another example of a binary pattern used in the determination unit 23. Values of one and zero are alternately lined up for each pixel in the horizontal direction; all ones or zeros are lined up in the vertical direction. Use of such binary pattern allows detection of striped patterns in the horizontal direction. Further, FIG. 17 shows a binary pattern used to detect striped patterns in the vertical direction. Values of one and zero are alternately lined up for each pixel in the horizontal direction; either all ones or all zeros are lined up in the vertical direction. Using such a binary pattern permits detection of striped patterns in the vertical direction.

Further, a determination may be made using a plurality of different patterns in such a manner that a determination is made whether it coincides with any one of a binary pattern for detecting a checkered pattern of the HF, as shown in FIG. 15; a binary pattern for detecting a striped pattern in the horizontal direction, as shown in FIG. 16; and a binary pattern for detecting a striped pattern in the vertical direction, as shown in FIG. 17.

As discussed, the pattern matching is performed by using the adjacent pixels in the vertical and horizontal directions, whereby only HF components that become a cause of moiré, such as by a checkered pattern, can be detected without mistakenly detecting letters or the like as HF components needed to be removed, even when input images contain patterns that vary minutely, such as of letters. It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An image processing apparatus for expanding/reducing input image data supplied thereto, for each area of the image data, the image processing apparatus comprising:
 a high frequency (HF) component detector that detects HF components of the input image data and creates HF component detection information that shows in which pixel in the input image data the HF component exists;
 a smoothing processor that generates smoothed image data by smoothing the input image data;
 an image data selection unit that selects, based on the HF component detection information, the smoothed image data and the input image data, and calculates a weighted average of the smoothed image data and the input image data, thereby generating smoothed-HF-component image data;
 a partial magnification/reduction controller that creates partial magnification/reduction control information that designates positions of pixels in image data obtained after expanding/reducing the input image data for each area of the image data; and
 a pixel data generator that generates pixel data for the pixel positions designated based on the partial magnification/reduction control information in the smoothed-HF-component image data, by using data of pixels in a neighborhood of the designated pixel positions,
 the HF component detector including:
  a threshold calculator that outputs threshold data containing upper and lower threshold values for quantizing the input image data into a plurality of ternary values;
  a quantization processor that quantizes, based on the threshold data, the input image data into ternary image data representing the plurality of ternary values, each ternary value being one of a first quantized pixel value corresponding to when an input pixel has a value larger than the upper threshold value, a second quantized pixel value corresponding to when an input pixel has a value smaller than the lower threshold value, and a third quantized pixel value corresponding to when an input pixel has a value in a range between the upper and lower threshold values; and
  a pattern match determination unit that performs pattern matching on the ternary image data using preset pattern data having a pixel pattern, to thereby create the HF component detection information, the pixel pattern being a quantized pixel pattern in which the first and second quantized pixel values are alternately lined up.

2. The image processing apparatus of claim 1, wherein
 (a) the smoothing processor generates smoothed image data by smoothing the input image data using pixels horizontally adjacent to a pixel of interest in the input image data,
 (b) the quantization processor generates the ternary image data by quantizing the input image data into the plurality of ternary values using the horizontally adjacent pixels and the threshold data, and
 (c) the pattern match determination unit performs the pattern matching on pixels horizontally adjacent to a pixel of interest in the plurality of ternary values.

3. The image processing apparatus of claim 1, further comprising an image data memory that retains image data for one line of the input image data or image data for a plurality of lines, wherein
 (a) the smoothing processor generates smoothed image data by smoothing the input image data using pixels horizontally adjacent to and pixels vertically adjacent to a pixel of interest in the input image data,
 (b) the quantization processor generates the ternary image data by quantizing the input image data into the plurality of ternary values using the threshold data and each of horizontally adjacent pixels and vertically adjacent pixels, and
 (c) the pattern match determination unit performs the pattern matching on pixels horizontally adjacent to and pixels vertically adjacent to the pixel of interest in the plurality of ternary values.

4. The image processing apparatus of claim 1, wherein the partial magnification/reduction control information is information for correcting a geometrical image distortion due to a predetermined projection optical system.

5. The image processing apparatus of claim 1, wherein the pixel pattern of the preset pattern data is a binary pattern.

6. The image processing apparatus of claim 1, wherein said image data selection unit is further configured to control the weights of the weighted average to calculate the smoothed-HF-component image data based on the HF component detection information.

7. An image display apparatus, comprising an image processing apparatus of claim 1.

8. An image processing method, comprising the steps of:
 detecting high frequency (HF) components of input image data and creating HF component detection information that shows in which pixel in the input image data the HF component exists;
 generating smoothed image data by smoothing the input image data;
 selecting, based on the HF component detection information, the smoothed image data and the input image data, and calculating a weighted average of the smoothed image data and input image data, thereby generating smoothed-HF-component image data;
 generating partial magnification/reduction control information that designates positions of pixels in image data obtained after magnification/reduction of the input image data for each area of the image data; and
 generating pixel data for the pixel positions designated based on the partial magnification/reduction control information in the smoothed-HF-component image data, by using pixel data in a neighborhood of the designated pixel positions,
 said detecting high frequency (HF) components including the steps of:
  outputting threshold data containing upper and lower threshold values for quantizing the input image data into a plurality of ternary values;
  quantizing, based on the threshold data, the input image data into ternary image data representing the plurality of ternary values, each ternary value being one of a first quantized pixel value corresponding to when an input pixel has a value larger than the upper threshold value, a second quantized pixel value corresponding to when an input pixel has a value smaller than the lower threshold value, and a third quantized pixel value corresponding to when an input pixel value has a value in a range between the upper and lower threshold values; and
  performing pattern matching on the ternary image data using preset pattern data having a pixel pattern, to thereby create the HF component detection information, the pixel pattern being a quantized pixel pattern in which the first and second quantized pixel values are alternately lined up.

9. The image processing method of claim 8, wherein the partial magnification/reduction control information is information for correcting a geometrical image distortion due to a predetermined projection optical system.

10. The image processing method of claim 8, wherein the pixel pattern of the preset pattern data is a binary pattern.

11. The image processing method of claim 8, further comprising: controlling the weights of the weighted average to calculate the smoothed-HF-component image data based on the HF component detection information.

* * * * *